United States Patent
Zheng et al.

(10) Patent No.: US 10,743,027 B2
(45) Date of Patent: Aug. 11, 2020

(54) METHODS AND APPARATUS FOR ADAPTIVE TEMPLATE MATCHING PREDICTION FOR VIDEO ENCODING AND DECODING

(75) Inventors: Yunfei Zheng, San Diego, CA (US); Peng Yin, Ithaca, NY (US); Joel Sole, La Jolla, CA (US); Xiaoan Lu, Princetont, NJ (US); Qian Xu, Folsom, CA (US)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 496 days.

(21) Appl. No.: 13/514,814

(22) PCT Filed: Dec. 2, 2010

(86) PCT No.: PCT/US2010/003075
§ 371 (c)(1),
(2), (4) Date: Jun. 8, 2012

(87) PCT Pub. No.: WO2011/071514
PCT Pub. Date: Jun. 16, 2011

(65) Prior Publication Data
US 2012/0281752 A1 Nov. 8, 2012

Related U.S. Application Data

(60) Provisional application No. 61/267,715, filed on Dec. 8, 2009.

(51) Int. Cl.
*H04N 19/46* (2014.01)
*H04N 19/61* (2014.01)
(Continued)

(52) U.S. Cl.
CPC .......... *H04N 19/61* (2014.11); *H04N 19/105* (2014.11); *H04N 19/122* (2014.11);
(Continued)

(58) Field of Classification Search
CPC ....... H04N 19/00024; H04N 19/00084; H04N 19/00278; H04N 19/00424;
(Continued)

(56) References Cited

U.S. PATENT DOCUMENTS

| 6,919,826 | B1 * | 7/2005 | Peacock | ................. | H03M 7/40 |
| | | | | | 341/107 |
| 2003/0156648 | A1 * | 8/2003 | Holcomb | ............. | H04N 19/136 |
| | | | | | 375/240.18 |

(Continued)

FOREIGN PATENT DOCUMENTS

| CN | 1710959 | 12/2005 |
| EP | 2640075 A2 | 9/2013 |

(Continued)

OTHER PUBLICATIONS

Zheng, etal, "Intra Prediction Using Template Matching With Adaptive Illumination Compensation", Jan. 2008.
(Continued)

*Primary Examiner* — Dave Czekaj
*Assistant Examiner* — Berteau Joisil
(74) *Attorney, Agent, or Firm* — Invention Mine LLC

(57) ABSTRACT

Methods and apparatus are provided for adaptive residual updating of template matching prediction for video encoding and decoding. In one embodiment, an apparatus and method encodes picture data for at least a block in a picture using template matching prediction, wherein the template matching prediction involves selecting from among a plurality of residual updating schemes for use in encoding the block. In another embodiment, an apparatus and method encodes a block in a picture using template matching prediction, wherein the template matching prediction involves partitioning the block into a plurality of sub-blocks, and applying a transform to a residual of a particular sub-block from among
(Continued)

the plurality of sub-blocks subsequent to searching for a prediction for the particular sub-block block and prior to completion of processing of the block with respect to the template matching prediction.

22 Claims, 15 Drawing Sheets

(51) Int. Cl.
    *H04N 19/105*     (2014.01)
    *H04N 19/30*     (2014.01)
    *H04N 19/122*     (2014.01)
    *H04N 19/147*     (2014.01)
    *H04N 19/176*     (2014.01)

(52) U.S. Cl.
    CPC ......... *H04N 19/147* (2014.11); *H04N 19/176* (2014.11); *H04N 19/30* (2014.11); *H04N 19/46* (2014.11)

(58) Field of Classification Search
    CPC ....... H04N 19/00781; H04N 19/00545; H04N 19/00175
    USPC .................................................. 375/240.03
    See application file for complete search history.

(56) References Cited

U.S. PATENT DOCUMENTS

| | | | | |
|---|---|---|---|---|
| 2007/0217506 | A1* | 9/2007 | Yang | H04N 19/147 375/240.03 |
| 2009/0116759 | A1 | 5/2009 | Suzuki et al. | |
| 2009/0116760 | A1 | 5/2009 | Boon et al. | |
| 2009/0180538 | A1* | 7/2009 | Visharam | H04N 19/176 375/240.15 |
| 2009/0196350 | A1 | 8/2009 | Xiong | |
| 2009/0232215 | A1* | 9/2009 | Park | H04N 19/52 375/240.16 |
| 2011/0007801 | A1* | 1/2011 | Andersson | H04N 19/176 375/240.14 |
| 2012/0106862 | A1 | 5/2012 | Sato | |

FOREIGN PATENT DOCUMENTS

| | | |
|---|---|---|
| JP | 2007-43651 A | 2/2007 |
| JP | 2007-300380 A | 11/2007 |
| JP | 2008-92352 A | 4/2008 |
| JP | 2010-268259 A | 11/2010 |

OTHER PUBLICATIONS

Balle et al., "Extended Texture Prediction for H.264/AVC Intra Coding", Video Coding Experts Group, ISO/IEC MPEG & ITU-T VCEG (ISO/IEC JTC1/SC29/WG11 and ITU-T SG16 Q6), Doc. No. VCEG-AE11, Jan. 14, 2007, pp. 1-7.

Guo et al., "Priority-based Template Matching Intra Prediction", 2008 IEEE Int'l Conference on Multimedia and Expo, Jun. 23, 2008, pp. 1117-1120.

Tan et al., "Intra Prediction by Averaged Template Matching Predictors", 4th IEEE Consumer Communications and Networking Conference, 2007, (CCNC 2007), Jan. 1, 2007, pp. 405-409.

Search Report dated Feb. 25, 2011.

Tan et al., "Intra Prediction by Template Matching", ICIP 2006, pp. 1693-1696.

* cited by examiner

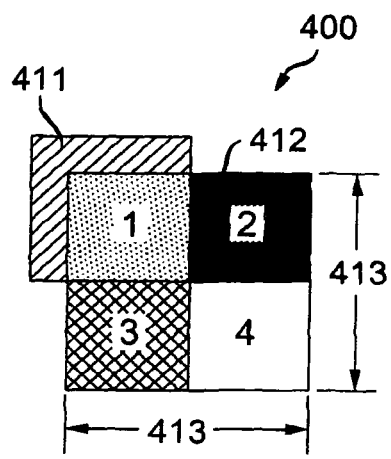
FIG. 4A
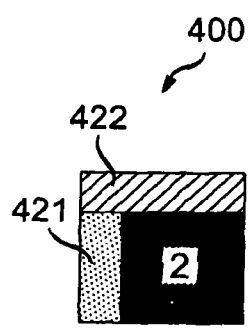   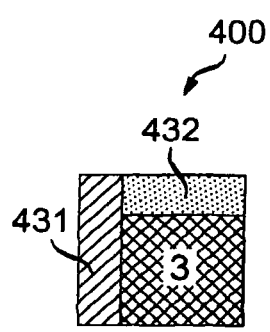   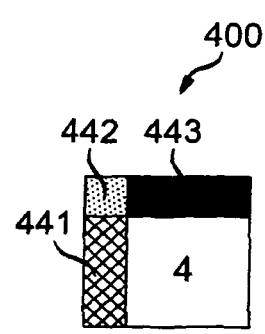
FIG. 4B    FIG. 4C    FIG. 4D

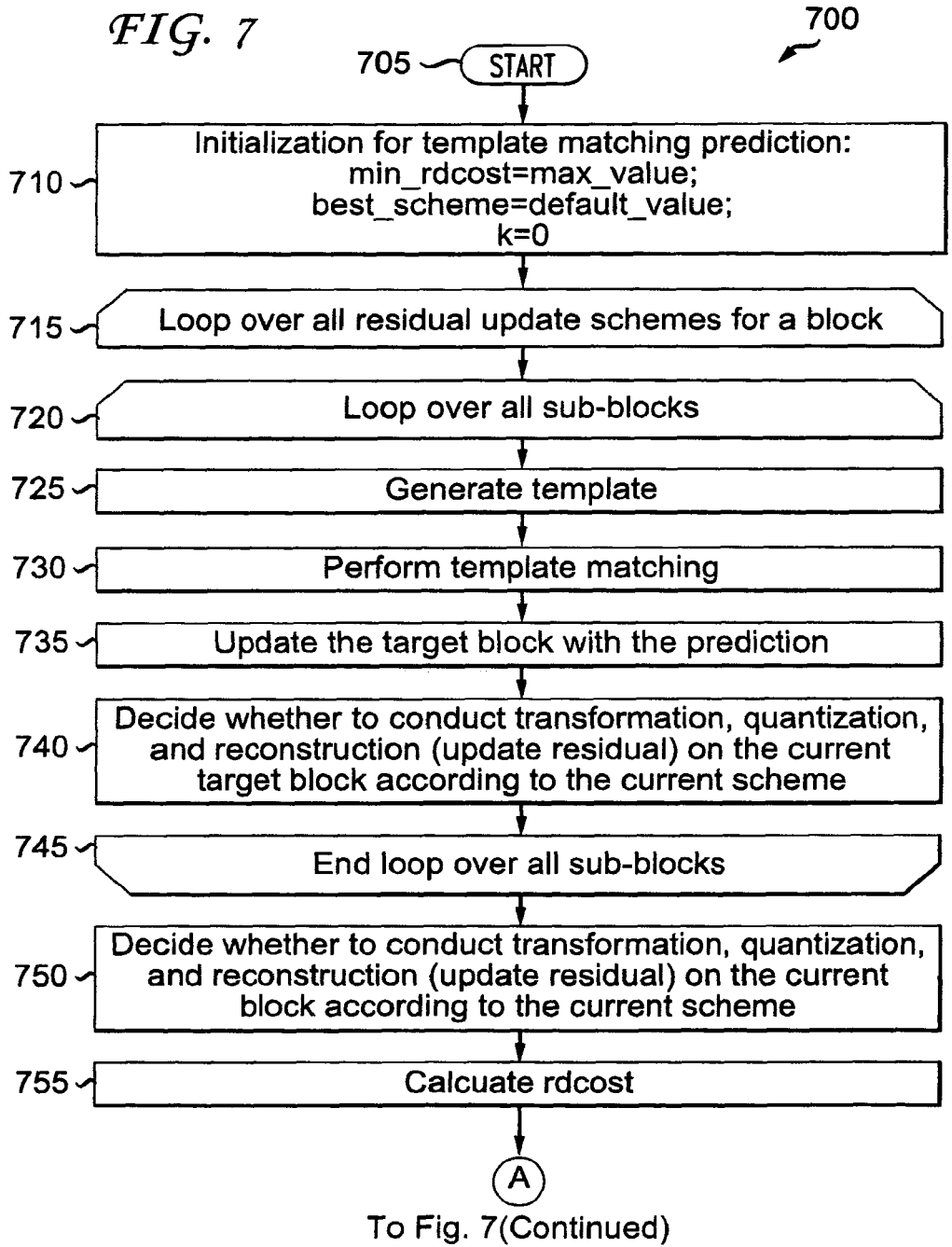

METHODS AND APPARATUS FOR ADAPTIVE TEMPLATE MATCHING PREDICTION FOR VIDEO ENCODING AND DECODING

This application claims the benefit, under 35 U.S.C. § 365 of International Application PCT/US2010/003075, filed Dec. 2, 2010, which was published in accordance with PCT Article 21(2) on Jun. 16, 2011 in English and which claims the benefit of U.S. provisional patent application No. 61/267,715, filed Dec. 8, 2009.

TECHNICAL FIELD

The present principles relate generally to video encoding and decoding and, more particularly, to methods and apparatus for adaptive residual updating of template matching prediction for video encoding and decoding.

BACKGROUND

Template matching prediction (TMP) can increase the coding efficiency for both inter and intra prediction by avoiding the transmission of motion/displacement information (motion vectors, reference index, and displacement vectors). However, the prediction obtained from using TMP is highly dependent on the correlation between a target block and its neighboring pixels (i.e., the template). Thus, template matching usually uses a relatively small block such as 2×2 or even a pixel as a processing unit. In many block-based encoders and decoders, the basic block size is determined by the transform size, which is usually larger than the block unit that is handled by template matching. The basic block size will be further divided into sub-blocks for template matching prediction. Since template matching exploits the neighboring pixels (e.g., upper and left neighbors) as the template that used to search, the template of some sub-blocks could include some pixels from neighboring sub-blocks. However, the residual can only be added to the prediction after the whole basic block is predicted, since the transform can only be applied once the basic block is fully predicted. Thus, some part of a template could include some predicted data which is not reconstructed by adding residuals. Although using the predicted data in a template can avoid possible blockiness at sub-block boundaries, such use can cause a low quality matching result since the predicted data could have more information loss than the reconstructed data.

Basic template matching prediction is based on the assumption that there exists a lot of repetitive patterns in video pictures. In consideration of the same, template matching searches for similar patterns in decoded video pictures by matching the neighboring pixels. Due to backward prediction characteristics, template matching can avoid the transmission of overhead such as motion vectors or displacement vectors and, thus, improve coding performance. Moreover, template matching can be used in both inter and intra predictions.

Template Matching Prediction in Inter Prediction

Template matching prediction in inter prediction is one way to predict target pixels without sending motion vectors. Given a target block of a frame, a target pixel in the block is determined by finding an optimum pixel from a set of reference samples, where the adjacent pixels of the optimum pixels have the highest correlation with those of the target pixels. Those adjacent pixels of the target pixels are called the template. In the prior art, the template is usually taken from the reconstructed surrounding pixels of the target pixels. Turning to FIG. 1, an example of a template matching prediction scheme for inter prediction is indicated generally by the reference numeral 100. The template matching prediction scheme 100 involves a reconstructed reference frame 110 having a search region 111, a prediction 112 within the search region 111, and a neighborhood 113 with respect to the prediction 112. The template matching prediction scheme 100 also involves a current frame 150 having a target block 151, a template 152 with respect to the target block 151, and a reconstructed region 153. In the case of inter-prediction, the template matching process can be seen as a motion vector search at the decoder side. Here, template matching is performed very similar to traditional motion estimation techniques. Namely, motion vectors are evaluated by calculating a cost function for accordingly displaced template-shaped regions in the reference frames. The best motion vector for the template is then used to predict the target area. Only those areas of the image where a reconstruction or at least a prediction signal already exists are accessed for the search. Thus, the decoder is able to execute the template matching process and predict the target area without additional side information.

Template matching can predict pixels in a target block without transmission of motion vectors. It is expected that the prediction performance of template matching prediction is comparable to that of the traditional block matching scheme if the correlation between a target block and its template is high. In the prior art, the template is taken from the reconstructed spatial neighboring pixels of the target pixels. The neighboring pixels sometimes have low correlations with the target pixels. Thus, the performance of template matching prediction can be lower than the traditional block matching scheme.

Template Matching Prediction in Intra Prediction

In intra prediction, template matching is one of the available non-local prediction approaches, since the prediction could be generated by the pixels far away from the target block. In intra template matching, the template definition is similar to that in inter template matching. However, one difference is that the search range is limited to the decoded part of the current picture. Turning to FIG. 2, an example of a template matching prediction scheme for intra prediction is indicated generally by the reference numeral 200. The template matching prediction scheme 200 involves a decoded part 210 of a picture 277. The decoded part 210 of the picture 277 has a search region 211, a candidate prediction 212 within the search region 211, and a neighborhood 213 with respect to the candidate prediction 212. The template matching prediction scheme 200 also involves an un-decoded part 220 of the picture 277. The un-decoded part 220 of the picture 277 has a target block 221, a template 222 with respect to the target block 221. For simplicity, the following description is based on intra template matching. However, it is appreciated by one of ordinary skill in this and related arts that the inter template counterpart can be readily extended.

Residual Update Scheme in Template Matching

Since template matching can avoid additional overhead, it has an advantage in predicting relatively grainy areas in a video picture by minimizing the attendant additional overhead usually required for such areas. In order to exploit the advantages of template matching, a target block during prediction is usually smaller than the basic coding block. For example, in the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), the basic coding block size can be 4×4 or 8×8. In one prior art approach, the target block size of template matching is defined as 2×2, which is half the size of the basic coding block 4×4. Turning to FIG. 3, an example of a sub-divided block for intra template matching prediction is indicated generally by the reference numeral 300. The intra template matching prediction involves a decoded part 310 of a picture 377. The decoded part 310 of the picture 377 has a search region 311 and a candidate prediction 312 within the search region 311, and neighborhood 313 with respect to the candidate prediction 312. The intra template matching prediction also involves an un-decoded part 320 of a picture 377. The un-decoded part 320 of the picture 377 has a target block 321 (also referred to as the sub-divided block for intra template matching prediction in the example of FIG. 3) and a template 322 with respect to the target block 321.

Since the transform size is usually equal to the basic block size (there are 4×4 transforms and 8×8 transforms in the MPEG-4 AVC Standard), that means we can only get the prediction residual transformed, quantized, and updated after at least a whole basic block is predicted. Thus, in template matching with a smaller target block size, a template may include some prediction data from previous predicted sub-blocks. We refer to this approach as "Method 1".

Turning to FIGS. 4A-D, an example of sub-blocks and their templates is indicated generally by the reference numeral 400. The example of FIG. 4 corresponds to the aforementioned "Method 1". In the example, a basic block 410 is divided into 4 sub-blocks (indicated by the reference numerals 1, 2, 3, and 4, respectively), each of which is a respective target block of the template matching prediction. Referring to FIG. 4A, the template of target block 1 is indicated by the reference numeral 411, the target block of the template matching prediction (as applied to the basic block) is indicated by the reference numeral 412, and basic block size is indicated by the reference numeral 413. Referring to FIG. 4B, the template of target block 2 is indicated by the regions represented by reference numerals 421 and 422. Referring to FIG. 4C, the template of target block 3 is indicated by the regions represented by reference numerals 431 and 432. Referring to FIG. 4D, the template of target block 4 is indicated by the regions represented by the reference numeral 441, 442, and 443. The prediction process of the four target blocks involves the following steps:

(1) generate a template for a target block (e.g., for target block 1) by using neighboring pixels;
(2) search the matches and generate a prediction for this target block;
(3) update the target block with its prediction;
(4) repeat steps (1) through (3) for target blocks 2, 3, and 4;
(5) get the residual block of the whole basic block;
(6) transform the whole residual block, quantize the coefficients, and inverse transform the quantized coefficients;
(7) generate a reconstructed block by adding the prediction block and the quantized residual block;
(8) finish the basic block.

Since target block 1 is the first sub-block of the block, the pixels in its template are all from the reconstructed picture. However, for other target blocks, such as target block 2, its template needs to have some pixels from target block 1. Accordingly, when predicting target block 2, target block 1 has just been predicted but not reconstructed because transformation and quantization have not been done until four target blocks are predicted at step (6). Thus, for the template of target block 2, some portion of its template comes from the prediction data of target block 1. The same issue exists when predicting other target blocks (i.e., other than target block 1, since as noted above, the pixels in the template for target block 1 are all from the reconstructed picture) by template matching.

Incorporating the prediction data of previous target blocks to the template of the current target block can make the prediction of the whole basic block vary smoothly. Moreover, we can enjoy the advantages from using a large transform when we apply the large transform (and attendant quantization) when all of the target blocks are completely predicted. However, incorporating the prediction data in the template for matching could propagate the prediction error and worsen the prediction.

SUMMARY

These and other drawbacks and disadvantages of the prior art are addressed by the present principles, which are directed to methods and apparatus for adaptive residual updating of template matching prediction for video coding.

According to an aspect of the present principles, there is provided an apparatus. The apparatus includes a video encoder for encoding picture data for at least a block in a picture using template matching prediction. The template matching prediction involves selecting from among a plurality of residual updating schemes for use in encoding the block.

According to another aspect of the present principles, there is provided a method in a video encoder. The method includes encoding picture data for at least a block in a picture using template matching prediction. The template matching prediction involves selecting from among a plurality of residual updating schemes for use in encoding the block.

According to yet another aspect of the present principles, there is provided an apparatus. The apparatus includes a video decoder for decoding picture data for at least a block in a picture using template matching prediction. The template matching prediction involves selecting from among a plurality of residual updating schemes for use in encoding the block.

According to still another aspect of the present principles, there is provided a method in a video decoder. The method includes decoding picture data for at least a block in a picture using template matching prediction. The template matching prediction involves selecting from among a plurality of residual updating schemes for use in encoding the block.

According to a further aspect of the present principles, there is provided an apparatus. The apparatus includes a video encoder for encoding a block in a picture using template matching prediction. The template matching prediction involves partitioning the block into a plurality of sub-blocks, and applying a transform to a residual of a particular sub-block from among the plurality of sub-blocks subsequent to searching for a prediction for the particular sub-block block and prior to completion of processing of the block with respect to the template matching prediction.

According to a still further aspect of the present principles, there is provided a method in a video encoder. The method includes encoding a block in a picture using template matching prediction. Template matching prediction involves partitioning the block into a plurality of sub-blocks, and applying a transform to a residual of a particular sub-block from among the plurality of sub-blocks subsequent to searching for a prediction for the particular sub-block block and prior to completion of processing of the block with respect to the template matching prediction.

According to a yet further aspect of the present principles, there is provided an apparatus. The apparatus includes a video decoder for decoding a block in a picture using template matching prediction. The template matching prediction involves partitioning the block into a plurality of sub-blocks, and applying a transform to a residual of a particular sub-block from among the plurality of sub-blocks subsequent to searching for a prediction for the particular sub-block block and prior to completion of processing of the block with respect to the template matching prediction.

According to an additional aspect of the present principles, there is provided a method in a video decoder. The method includes decoding a block in a picture using template matching prediction, wherein the template matching prediction involves partitioning the block into a plurality of sub-blocks, and applying a transform to a residual of a particular sub-block from among the plurality of sub-blocks subsequent to searching for a prediction for the particular sub-block block and prior to completion of processing of the block with respect to the template matching prediction.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIGS. 4A-D are diagrams collectively showing an example of sub-blocks and their templates;

DETAILED DESCRIPTION

Figure 1:
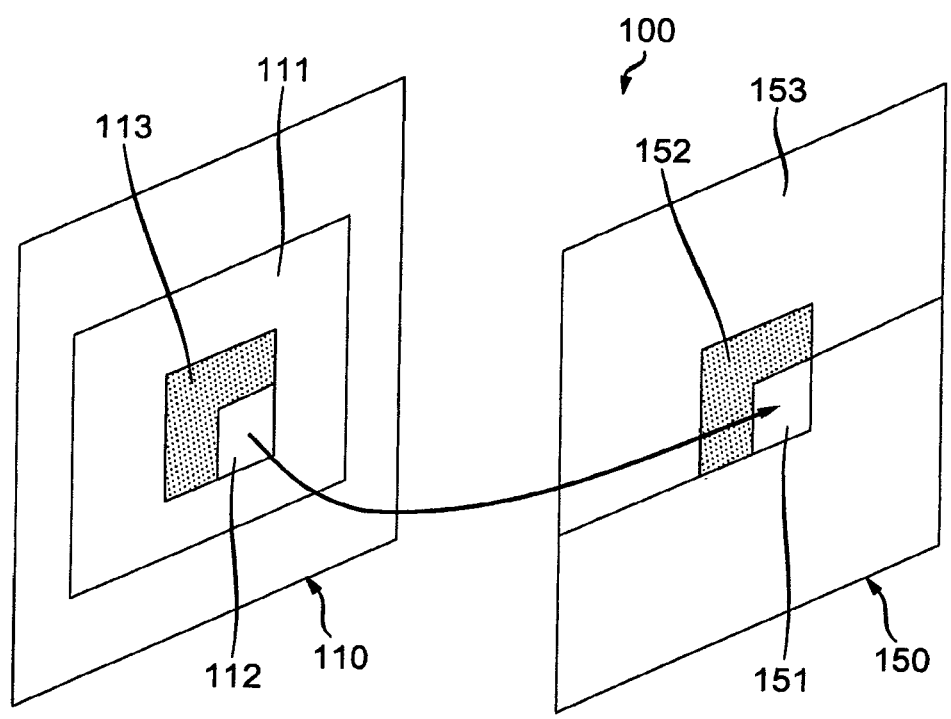
FIG. 1 is a diagram showing an example of a template matching prediction scheme for inter prediction.
Figure 2:
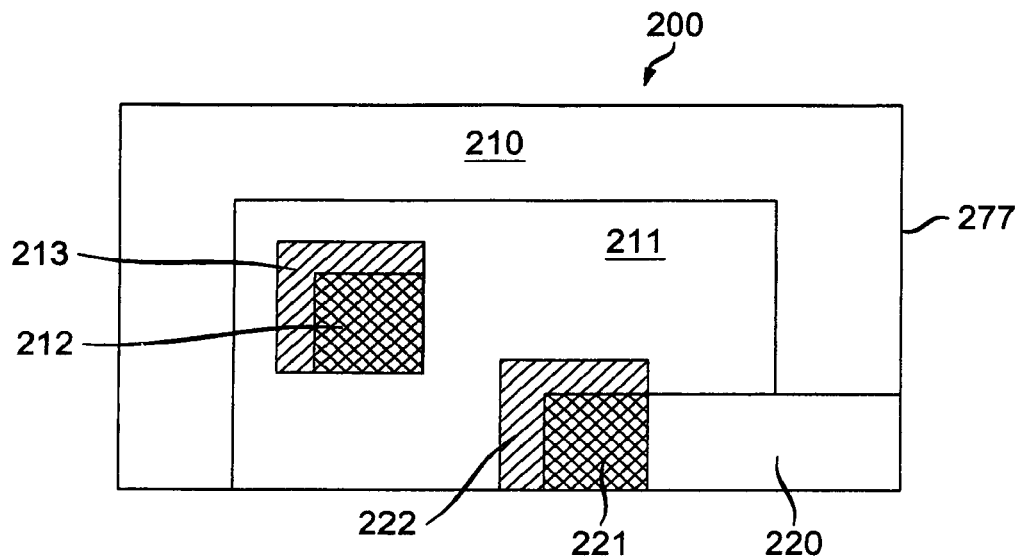
FIG. 2 is a diagram showing an example of a template matching prediction scheme for intra prediction.
Figure 3:
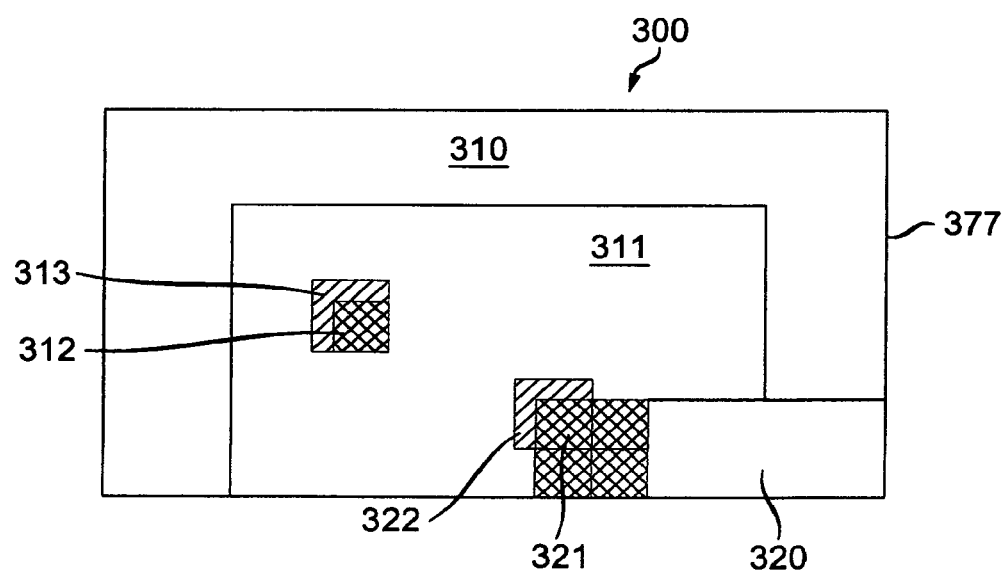
FIG. 3 is a diagram showing an example of a sub-divided block for intra template matching prediction.

The present principles are directed to methods and apparatus for adaptive residual updating of template matching prediction for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment. Moreover, it is to be appreciated that the phrases embodiment and implementation are used interchangeably herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal one or more residual updating schemes in order to make the decoder aware of which particular residual updating schemes were used on the encoder side. In this way, the same residual updating schemes may be used at both the encoder side and the decoder side. Thus, for example, an encoder may transmit a particular one or more residual updating schemes to the decoder so that the decoder may use the same particular residual updating schemes or, if the decoder already has the particular one or more residual updating schemes as well as others, then signaling may be used (without transmitting) to simply allow the decoder to know and select the particular one or more residual updating schemes from a larger grouping of the residual updating schemes. By avoiding transmission of any actual residual updating schemes, a bit savings may be realized. It is to be appreciated that signaling may be accomplished in a variety of ways. For example, one or more syntax elements, flags, and so forth may be used to signal information to a corresponding decoder.

Further, as used herein, the words "basic block" refer to the block that a pre-defined transform in an encoder and decoder is applied to.

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

Figure 5:
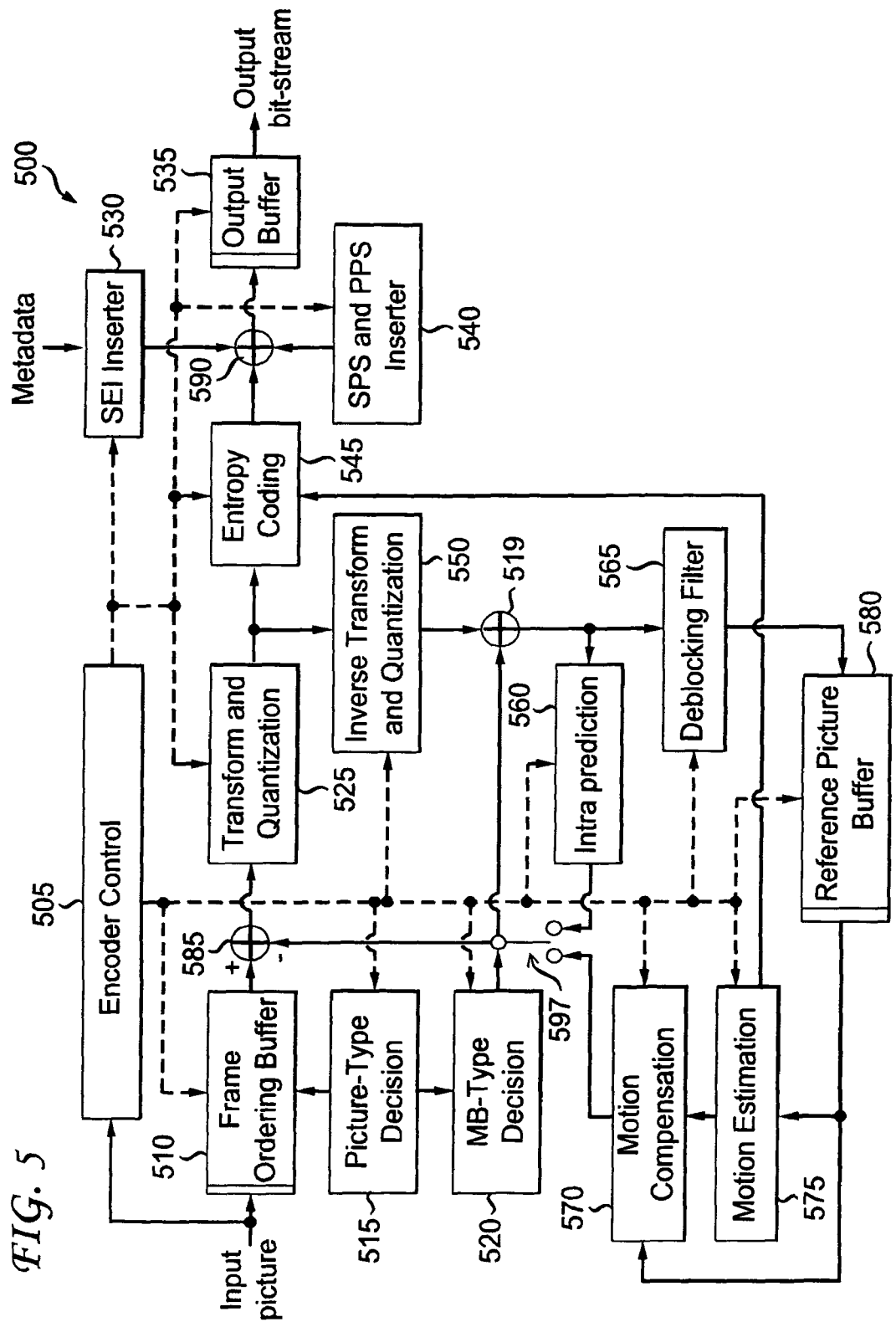
FIG. 5 is a block diagram showing an exemplary video encoder to which the present principles may be applied, in accordance with an embodiment of the present principles.

Turning to FIG. 5, an exemplary video encoder to which the present principles may be applied is indicated generally by the reference numeral 500. The video encoder 500 includes a frame ordering buffer 510 having an output in signal communication with a non-inverting input of a combiner 585. An output of the combiner 585 is connected in signal communication with a first input of a transformer and quantizer 525. An output of the transformer and quantizer 525 is connected in signal communication with a first input of an entropy coder 545 and a first input of an inverse transformer and inverse quantizer 550. An output of the entropy coder 545 is connected in signal communication with a first non-inverting input of a combiner 590. An output of the combiner 590 is connected in signal communication with a first input of an output buffer 535.

A first output of an encoder controller 505 is connected in signal communication with a second input of the frame ordering buffer 510, a second input of the inverse transformer and inverse quantizer 550, an input of a picture-type decision module 515, a first input of a macroblock-type (MB-type) decision module 520, a second input of an intra prediction module 560, a second input of a deblocking filter 565, a first input of a motion compensator 570, a first input of a motion estimator 575, and a second input of a reference picture buffer 580.

A second output of the encoder controller 505 is connected in signal communication with a first input of a Supplemental Enhancement Information (SEI) inserter 530, a second input of the transformer and quantizer 525, a second input of the entropy coder 545, a second input of the output buffer 535, and an input of the Sequence Parameter Set (SPS) and Picture Parameter Set (PPS) inserter 540.

An output of the SEI inserter 530 is connected in signal communication with a second non-inverting input of the combiner 590.

A first output of the picture-type decision module 515 is connected in signal communication with a third input of the frame ordering buffer 510. A second output of the picture-type decision module 515 is connected in signal communication with a second input of a macroblock-type decision module 520.

An output of the Sequence Parameter Set (SPS) and Picture Parameter Set (PPS) inserter 540 is connected in signal communication with a third non-inverting input of the combiner 590.

An output of the inverse quantizer and inverse transformer 550 is connected in signal communication with a first non-inverting input of a combiner 519. An output of the combiner 519 is connected in signal communication with a first input of the intra prediction module 560 and a first input of the deblocking filter 565. An output of the deblocking filter 565 is connected in signal communication with a first input of a reference picture buffer 580. An output of the reference picture buffer 580 is connected in signal communication with a second input of the motion estimator 575 and a third input of the motion compensator 570. A first output of the motion estimator 575 is connected in signal communication with a second input of the motion compensator 570. A second output of the motion estimator 575 is connected in signal communication with a third input of the entropy coder 545.

An output of the motion compensator 570 is connected in signal communication with a first input of a switch 597. An output of the intra prediction module 560 is connected in signal communication with a second input of the switch 597. An output of the macroblock-type decision module 520 is connected in signal communication with a third input of the switch 597. The third input of the switch 597 determines whether or not the "data" input of the switch (as compared to the control input, i.e., the third input) is to be provided by the motion compensator 570 or the intra prediction module 560. The output of the switch 597 is connected in signal communication with a second non-inverting input of the combiner 519 and an inverting input of the combiner 585.

A first input of the frame ordering buffer 510 and an input of the encoder controller 505 are available as inputs of the encoder 500, for receiving an input picture. Moreover, a second input of the Supplemental Enhancement Information (SEI) inserter 530 is available as an input of the encoder 500, for receiving metadata. An output of the output buffer 535 is available as an output of the encoder 500, for outputting a bitstream.

Figure 6:
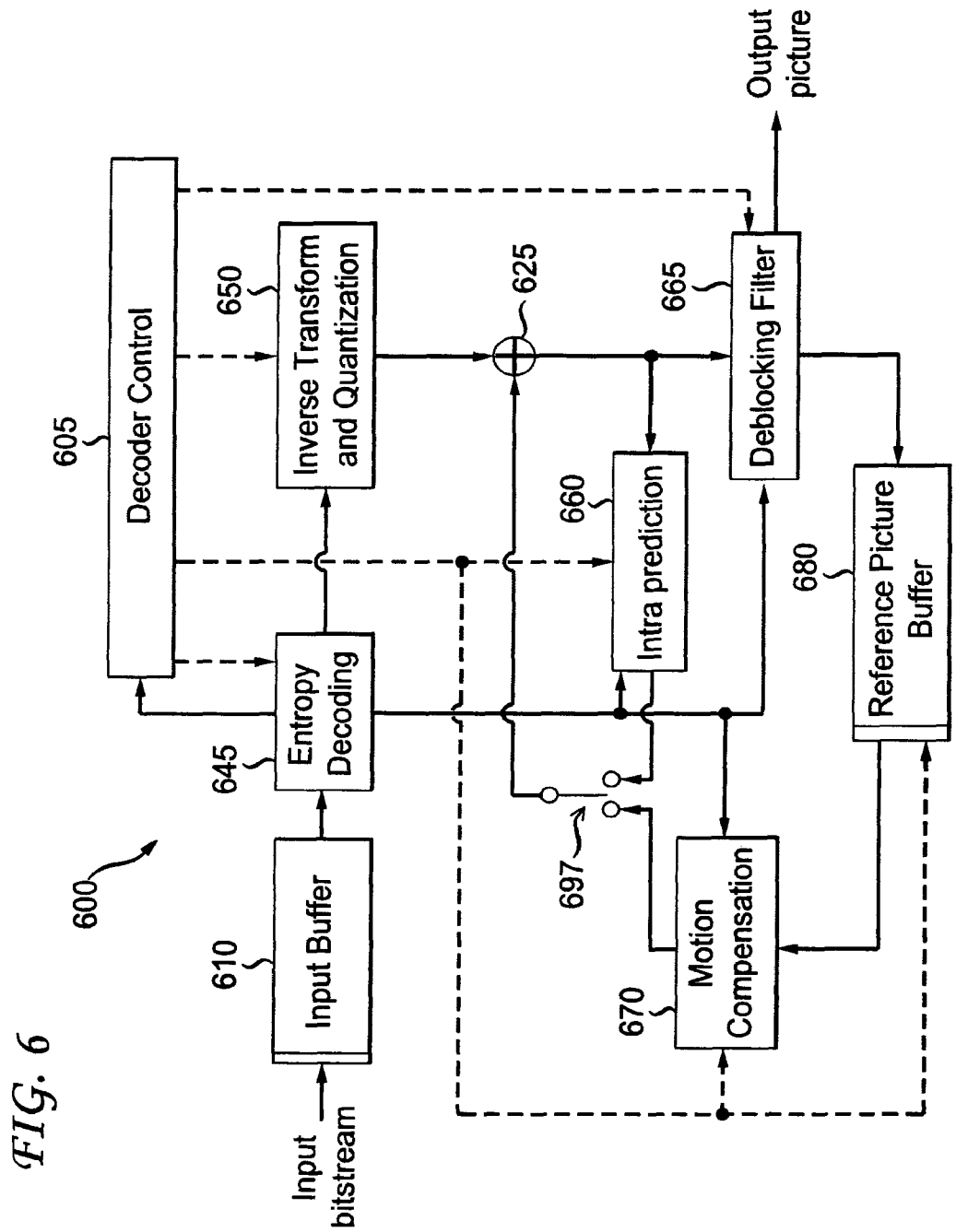
FIG. 6 is a block diagram showing an exemplary video decoder to which the present principles may be applied, in accordance with an embodiment of the present principles.

Turning to FIG. 6, an exemplary video decoder to which the present principles may be applied is indicated generally by the reference numeral 600. The video decoder 600 includes an input buffer 610 having an output connected in signal communication with a first input of an entropy decoder 645. A first output of the entropy decoder 645 is connected in signal communication with a first input of an inverse transformer and inverse quantizer 650. An output of the inverse transformer and inverse quantizer 650 is connected in signal communication with a second non-inverting input of a combiner 625. An output of the combiner 625 is connected in signal communication with a second input of a deblocking filter 665 and a first input of an intra prediction module 660. A second output of the deblocking filter 665 is connected in signal communication with a first input of a reference picture buffer 680. An output of the reference picture buffer 680 is connected in signal communication with a second input of a motion compensator 670.

A second output of the entropy decoder 645 is connected in signal communication with a third input of the motion compensator 670, a first input of the deblocking filter 665, and a third input of the intra predictor 660. A third output of the entropy decoder 645 is connected in signal communication with an input of a decoder controller 605. A first output of the decoder controller 605 is connected in signal communication with a second input of the entropy decoder 645. A second output of the decoder controller 605 is connected in signal communication with a second input of the inverse transformer and inverse quantizer 650. A third output of the decoder controller 605 is connected in signal communication with a third input of the deblocking filter 665. A fourth output of the decoder controller 605 is connected in signal communication with a second input of the intra prediction module 660, a first input of the motion compensator 670, and a second input of the reference picture buffer 680.

An output of the motion compensator 670 is connected in signal communication with a first input of a switch 697. An output of the intra prediction module 660 is connected in signal communication with a second input of the switch 697. An output of the switch 697 is connected in signal communication with a first non-inverting input of the combiner 625.

An input of the input buffer 610 is available as an input of the decoder 600, for receiving an input bitstream. A first output of the deblocking filter 665 is available as an output of the decoder 600, for outputting an output picture.

As noted above, the present principles are directed to methods and apparatus for adaptive residual updating of template matching prediction for video encoding and decoding. In an embodiment, we update the residual at a smaller block level which can, in turn, provide a better prediction with sacrificing the efficiency of a large transform and attendant quantization. In another embodiment, which affords the advantages of residual updating schemes while improving coding performance, we also propose an adaptive switching approach to select the best scheme for a certain coding block. In particular, we propose to select between different residual update schemes in template matching for a current block to be encoded. The uncertainty of the switch status can be explicitly transmitted in a resultant bitstream or be implicitly derived, for example, from the decoded picture information. The purpose of this adaptive switching scheme is to find the best tradeoff between the prediction and the transform for template matching by exploiting different residual update methods and, thus, improve the coding efficiency. The proposed technique can be applied for both intra and inter predictions.

Thus, in accordance with the present principles, we disclose and describe a method, which we refer to as "Method 2", in which we exploit smaller transform sizes, thus improving the prediction data. The prediction process of the four target blocks involves the following steps:

(1) generate a template for a target block (within and/or otherwise corresponding to a basic block) by using neighboring pixels;
(2) search the matches and generate a prediction for this target block;
(3) update the target block with its prediction;
(4) transform the residual of the target block to obtain transform coefficients, quantize the coefficients, and inverse transform the quantized coefficients;
(5) generate a reconstructed target block by adding the prediction target block and the quantized residual target block;
(6) update the target block with its reconstruction;
(7) repeat steps (1) through (6) for target blocks 2, 3, and 4;
(8) finish the basic block.

Once the transform is based on a smaller block, the neighboring sub-blocks can be reconstructed earlier. Thus, the later predicted target blocks can use reconstructed pixels as a template instead of using prediction data, which will improve the prediction performance.

Adaptive Residue Update

In a first residual update scheme, a more efficient scheme is used at the transform (e.g., by using a larger transform) but the prediction can be worse, while a second residual update scheme can have better prediction (than the first scheme) but may sacrifice the efficiency attendant with using a large transform. In accordance with the present principles, we combine these two schemes into an adaptive residual updating framework in order to achieve a good trade-off between the prediction accuracy and the efficiency of transform and quantization by exploiting the advantages of both methods for improving coding efficiency.

Different target sizes and different available transform sizes can result in various residual updating schemes. The optimal residual updating scheme in accordance with the present principles will be able to exploit all their advantages and circumvent their disadvantages adaptively.

In accordance with the present principles, we build a framework to unify the residual update schemes. In this framework, there could be many different residual update schemes for template matching. The uncertainty among these schemes can be either explicitly sent in a resultant bitstream or implicitly derived, for example, based on already coded pictures. For the sakes of illustration and simplicity, we presume that we have two residual update schemes available to select from, but note that the present principles can be readily extended by one of ordinary skill in this and related arts to involve more than two residual update schemes.

Embodiment 1: Explicit Switching Method

When there are two or more residual updating schemes as described above, the uncertainty between such schemes needs to be resolved. In this embodiment, we propose an explicit switching method by using, for example, a flag or an indicator to indicate which scheme will be chosen. At the encoder, we can evaluate all of the residual updating schemes and select the best residual updating scheme in consideration of, for example, a rate-distortion (RD) cost, and then send the flag or indicator to a corresponding decoder. At the decoder, we resolve the uncertainty by reading the flag or indicator from the bitstream, and apply the corresponding scheme when decoding.

Figure 7:
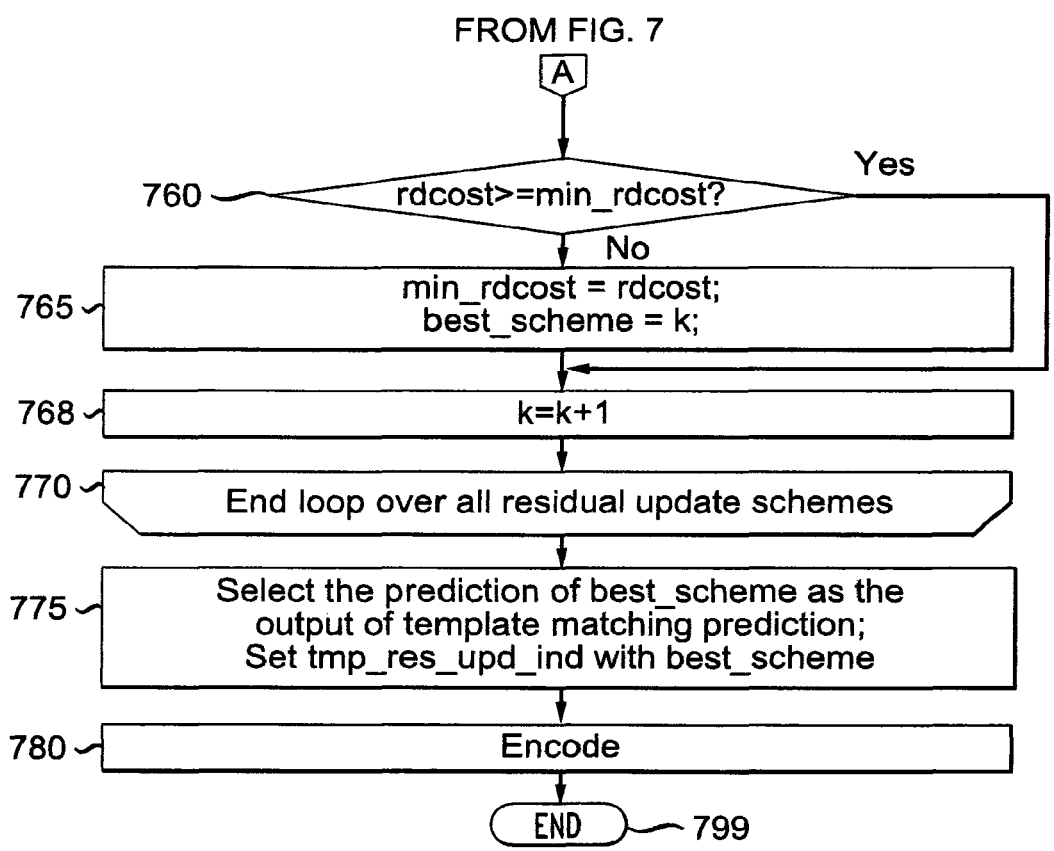
FIG. 7 is a flow diagram showing an exemplary method for adaptive residual updating of template matching prediction in a video encoder, in accordance with an embodiment of the present principles.

Turning to FIG. 7, an exemplary method for adaptive residual updating of template matching prediction in a video encoder is indicated generally by the reference numeral 700. The method 700 includes a start block 705 that passes control to a function block 710. The function block 710 performs an initialization for template matching prediction by setting min_rdcost=max_value, best_scheme=default_value, k=0, and passes control to a loop limit block 715. The loop limit block 715 begins a loop over all residual updates schemes for a block, and passes control to a loop limit block 720. The loop limit block 720 begins a loop over all sub-blocks, and passes control to a function block 725. The function block 725 generates a template, and passes control to a function block 730. The function block 730 performs template matching, and passes control to a function block 735. The function block 735 updates the target block with the prediction, and passes control to a function block 740. The function block 740 decides whether to conduct transformation, quantization, and reconstruction (update residual) on the current target block according to the current scheme, and passes control to a loop limit block 745. The loop limit block 745 ends the loop over all the sub-blocks, and passes control to a function block 750. The function block 750 decides whether to conduct transformation, quantization, and reconstruction (update residual) on the current block according to the current scheme, and passes control to a function block 755. The function block 755 calculates a rate-distortion (RD) cost corresponding to the decision obtained by function block 750, and passes control to a decision block 760. The decision block 760 determines whether or not rdcost >=min_rdcost. If so, then control is passed to a loop limit block 768. Otherwise, control is passed to a function block 765. The function block 765 sets min_rdcost=rdcost, and best_scheme=k, and passes control to a function block 768. The function block 768 sets k=k+1 and passes control to the loop limit block 770. The loop limit block 770 ends the loop over all residual update schemes, and passes control to a function block 775. The function block 775 selects the prediction of best_scheme as the output of the template matching prediction, sets tmp_res_upd_ind with best_scheme, and passes control to a function block 780. The function block 780 encodes all the syntax (including tmp_res_upd_ind) and involved coefficients information, and passes control to an end block 799.

Figure 8:
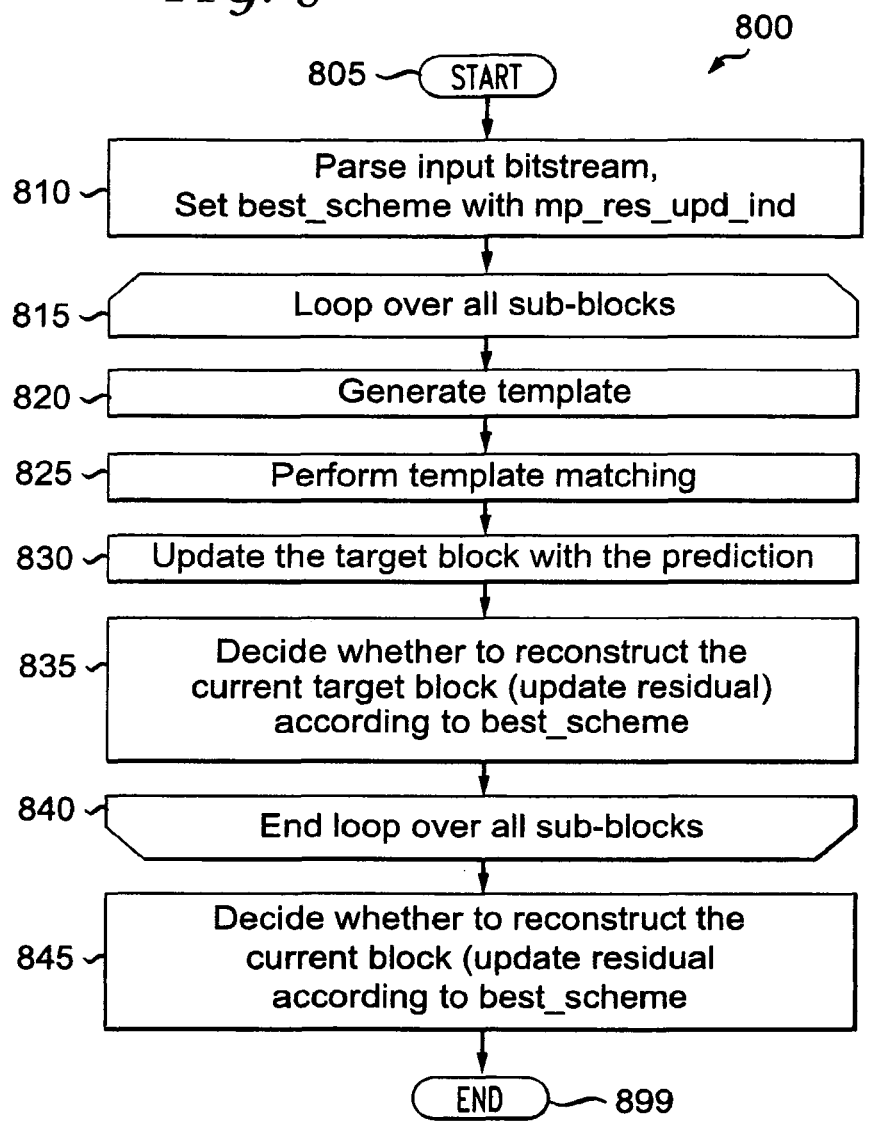
FIG. 8 is a flow diagram showing an exemplary method for adaptive residual updating of template matching prediction in a video decoder, in accordance with an embodiment of the present principles.

Turning to FIG. 8, an exemplary method for adaptive residual updating of template matching prediction in a video decoder is indicated generally by the reference numeral 800. The method 800 includes a start block 805 that passes control to a function block 810. The function block 810 parses an input bitstream, sets best_scheme with tmp_res_upd_ind, and passes control to a loop limit block 815. The loop limit block 815 begins a loop over all sub-blocks, and passes control to a function block 820. The function block 820 generates a template, and passes control to a function block 825. The function block 825 performs template matching, and passes control to a function block 830. The function block 830 updates the target block with the prediction, and passes control to a function block 835. The function block 835 decides whether to reconstruct the current target block (update residual) according to best_scheme, and passes control to a loop limit block 840. The loop limit block 840 ends the loop over all the sub-blocks, and passes control to a function block 845. The function block 845 decides whether to reconstruct the current block (update residual) according to best_scheme, and passes control to an end 899.

Embodiment 2: Implicit Switching Method

The explicit switching method can always select the best scheme at the encoder by paying the cost for additional side information, which may degrade the coding performance. As noted above, to avoid having to transmit the additional side information, the uncertainty among different schemes can be derived implicitly. We can exploit the partition information, neighboring blocks coding information (e.g., transform size, coefficients, mode, and/or so forth), local picture content statistics (e.g., mean, variance, and/or so forth), and so forth. This implicit switching method can avoid the additional overhead in the explicit switching method and, thus, may be favored for use in the case of slow varying content. A method involving this embodiment at a video encoder is described with respect to FIG. 9 below, and a method involving this embodiment at a video decoder is described with respect to FIG. 10 below.

Embodiment 3: Quantization Parameter Dependent Switching Method

The sooner the residual is updated to a particular sub-block, the more likely the following sub-blocks (with respect to the particular sub-block) will be able to obtain a better prediction. Moreover, the prediction of the whole block will be better. When a block is coded with a large quantization parameter (QP) value, we prefer to have a better prediction available for use since the residual only provides a small amount information in such a case. On the other hand, when a block is coded with relatively smaller quantization parameter values, the residual is very important and can compensate for a significant amount of prediction error. Accordingly, in consideration of the preceding, we provide a quantization parameter dependent switching method. For example, considering we have only introduced the two previously described schemes, when the quantization parameter value is large, we can use Method 2 to obtain a better prediction. Otherwise, we use Method 1 to keep the advantages of using a large transform.

Figure 9:
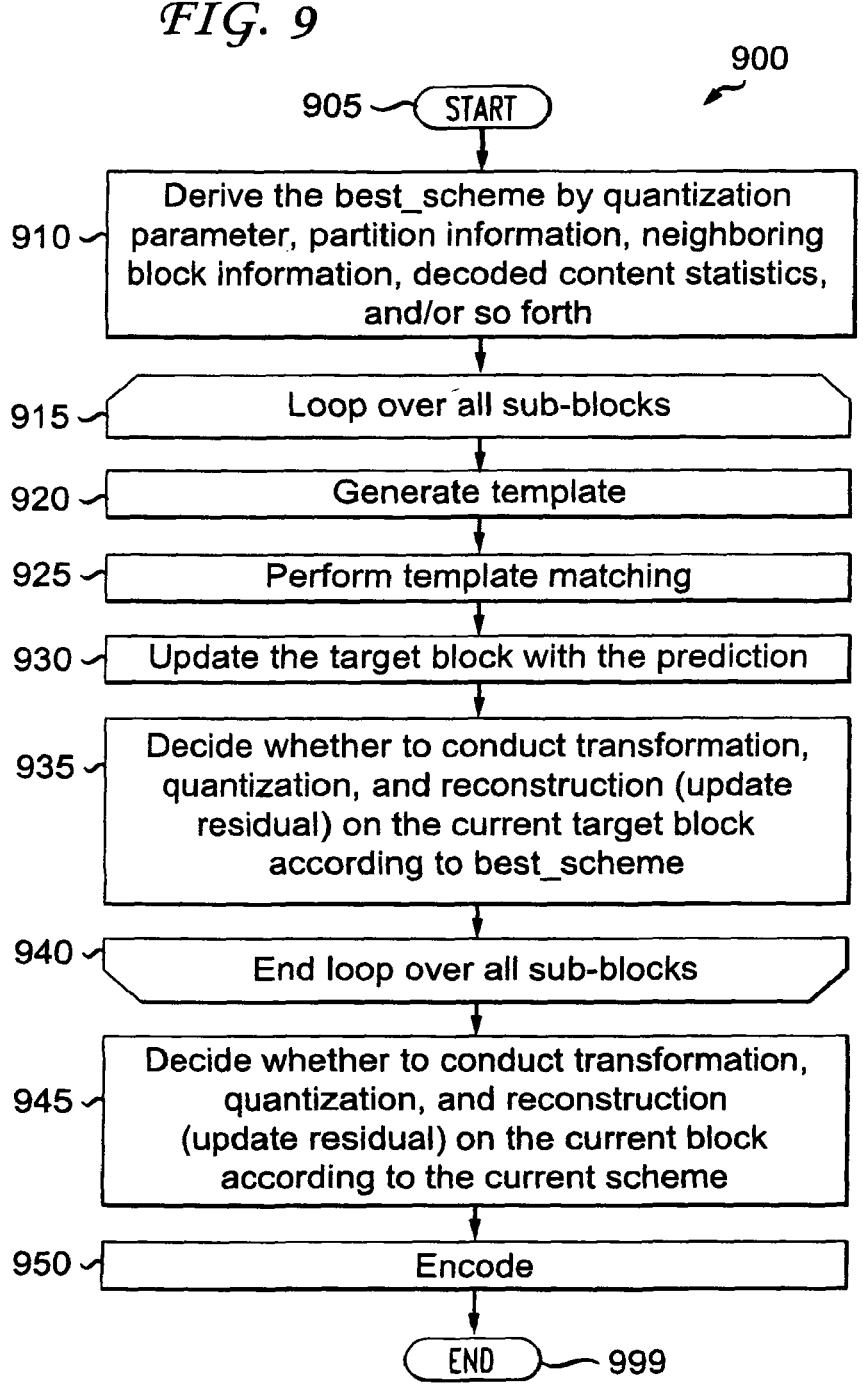
FIG. 9 is a flow diagram showing another exemplary method for adaptive residual updating of template matching prediction in a video encoder, in accordance with an embodiment of the present principles.
Figure 10:
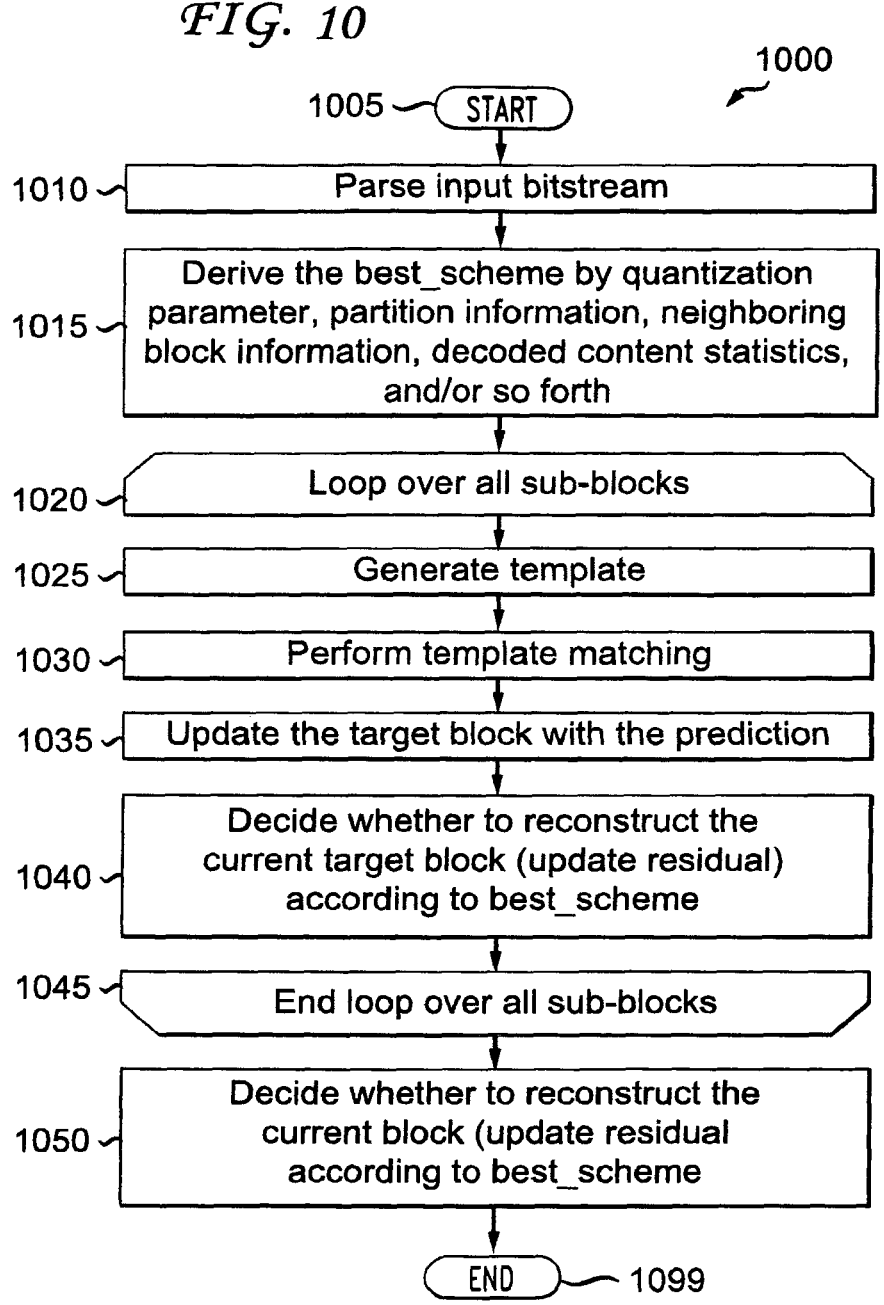
FIG. 10 is a flow diagram showing another exemplary method for adaptive residual updating of template matching prediction in a video decoder, in accordance with an embodiment of the present principles.

The following FIGS. 9 and 10 pertain to both Embodiments 2 and 3 described herein.

Turning to FIG. 9, another exemplary method for adaptive residual updating of template matching prediction in a video encoder is indicated generally by the reference numeral 900. The method 900 includes a start block 905 that passes control to a function block 910. The function block 910 derives the best_scheme by quantization parameter (QP), partition information, neighboring block information, decoded content statistics, and/or so forth, and passes control to a loop limit block 915. The loop limit block 915 loops over all sub-blocks, and passes control to a function block 920. The function block 920 generates a template, and passes control to a function block 925. The function block 925 performs template matching, and passes control to a function block 930. The function block 930 updates the target block with the prediction, and passes control to a function block 935. The function block 935 decides whether to conduct transformation, quantization, and reconstruction (update residual) on the current target block according to best_scheme, and passes control to a loop limit block 940. The loop limit block 940 ends the loop over all sub-blocks, and passes control to a function block 945. The function block 945 decides whether to conduct transformation, quantization, and reconstruction (update residual) on the current block according to the current scheme, and passes control to a function block 950. The function block 950 encodes all syntax and involved coefficients information, and passes control to an end block 999.

Turning to FIG. 10, another exemplary method for adaptive residual updating of template matching prediction in a video decoder is indicated generally by the reference numeral 1000. The method 1000 includes a start block 1005 that passes control to a function block 1010. The function block 1010 parses an input bitstream, and passes control to a function block 1015. The function block 1015 derives best_scheme by quantization parameter (QP), partition information, neighboring block information, decoded content statistics, and/or so forth, and passes control to a loop limit block 1020. The loop limit block 1020 begins a loop over all sub-blocks, and passes control to a function block 1025. The function block 1025 generates a template, and passes control to a function block 1030. The function block 1030 performs template matching, and passes control to a function block 1035. The function block 1035 updates the target block with the prediction, and passes control to a function block 1040. The function block 1040 decides whether to reconstruct the current target block (update residual) according to best_scheme, and passes control to a loop limit block 1045. The loop limit block 1045 ends the loop over all the sub-blocks, and passes control to a function block 1050. The function block 1050 decides whether to reconstruct the current block (update residual) according to best_scheme, and passes control to an end block 1099.

Syntax

TABLE 1 shows exemplary slice header syntax for Embodiments 1, 2, and 3, according to an embodiment of the present principles.

TABLE 1

| slice_header( ) { | Descriptor |
|---|---|
| ... | |
|     use_tmp_res_upd_flag | u(1) |
|     if( use_tmp_res_upd_flag == 1){ | |
|         use_exp_tmp_res_upd_flag | u(1) |
|         if (use_exp_tmp_res_upd_flag == 0){ | |
|             use_qp_tmp_res_upd_flag | u(1) |
|         } | |
|     } | |
|     ... | |
| } | |
| marco_block_header( ) { | |
| ... | |
|     if ( use_exp_tmp_res_upd_flag == 1){ | |
|         tmp_res_upd_ind | u(v) |
|     } | |
|     ... | |
| } | |

The semantics of some of the syntax elements of TABLE 1 are as follows:

use_tmp_res_upd_flag equal to 1 specifies the use of the multiple residual update scheme in template matching; use_tmp_res_upd_flag equal to 0 specifies the use of only one residual update scheme.

use_exp_tmp_res_upd_flag equal to 1 specifies the use of the explicit switching method; use_exp_tmp_res_upd_flag equal to 0 specifies the use of the implicit switching method.

use_qp_tmp_res_upd_flag equal to 1 specifies the use of the quantization parameter dependent switching method; use_qp_tmp_res_upd_flag equal to 0 specifies not to use the quantization parameter dependent switching method.

tmp_res_upd_ind indicates the corresponding residual updating scheme used by the current block.

Embodiment 4: Multi-Layer Residual Updating Method

In this embodiment, a novel multi-layer residual updating method is proposed. Specifically, the basic block will be coded twice, presuming only the two methods presented here exist. Thus, it is to be appreciated that in other embodiments, involving more than two residual updating methods, the basic block may be coded more than twice.

Nonetheless, in the aforementioned example involving coding the basic block twice, first the block is coded by Method 2 with a relatively high quantization parameter value. Then we can get a reconstructed version of the basic block. In the fifth step, the block is coded by Method 1 with a relatively low quantization parameter value. However, in the fifth step, the templates can be generated based on the reconstructed block output from the first step. Finally, we will transmit the residuals from both steps in a resultant bitstream. At the decoder, similar steps are performed. In one implementation, Embodiment 4 involves the following steps:

(1) set a relatively high quantization parameter value;
(2) code the whole basic block with Method 2 using a small transform size;

(3) obtain a reconstructed basic block based on Method 2;
(4) set a relatively lower quantization parameter;
(5) code the basic block based on Method 1 using a large transform, where the template generation can be based on the reconstructed basic block obtained from step (3);
(6) transmit the residual coefficients from steps (2) and (5);
(7) finish the block.

References to step (2), step (3) and step (5) in the following FIGS. 11 and 12 pertain to the immediately preceding listing of steps relating to Embodiment 4.

Figure 11:
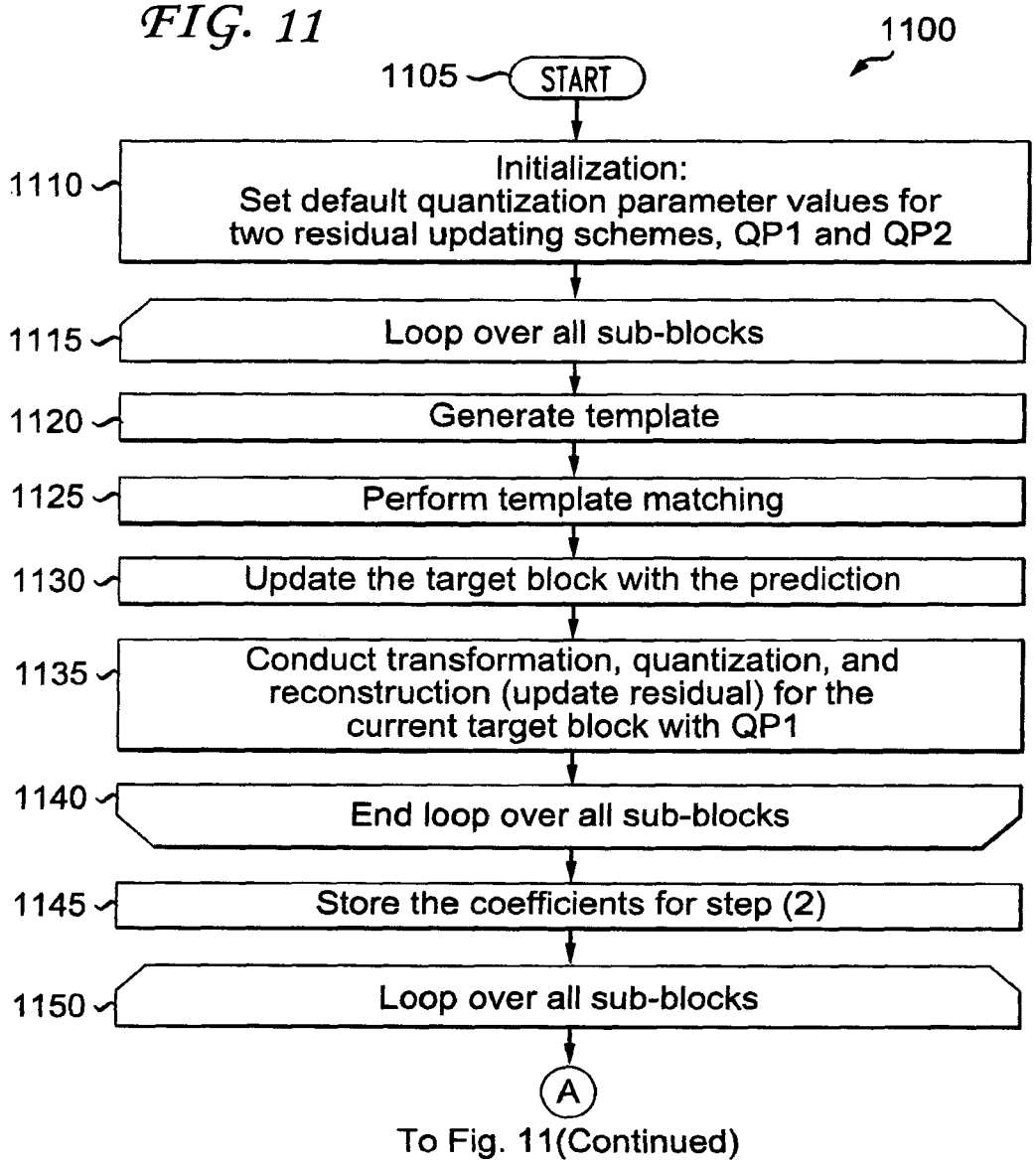
FIG. 11 is a flow diagram showing yet another exemplary method for adaptive residual updating of template matching prediction in a video encoder, in accordance with an embodiment of the present principles.
Figure 11:
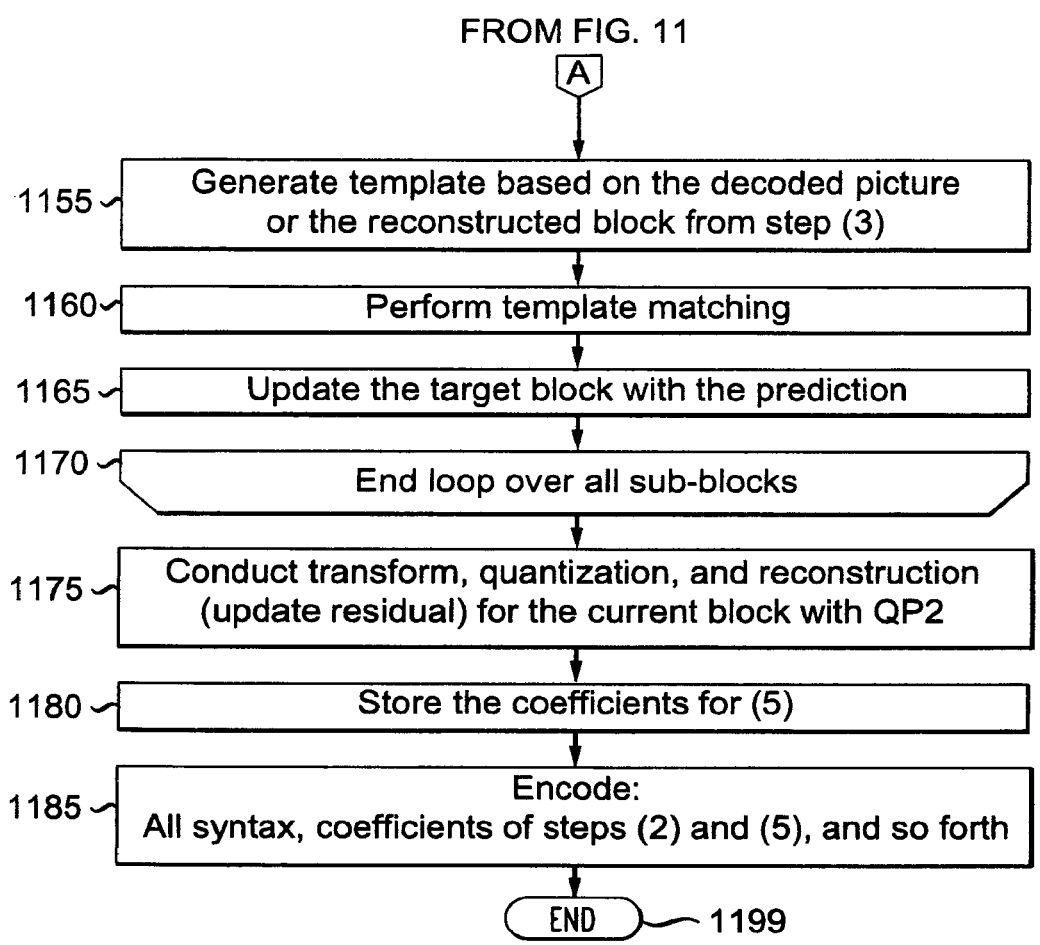

Turning to FIG. 11, yet another exemplary method for adaptive residual updating of template matching prediction in a video encoder is indicated generally by the reference numeral 1100. The method 1100 includes a start block 1105 that passes control to a function block 1110. The function block 1110 performs an initialization for template matching prediction by the default quantization parameter values for two residual updating schemes, namely QP1 and QP2, and passes control to a loop limit block 1115. The loop limit block 1115 begins a loop over all sub-blocks, and passes control to a function block 1120. The function block 1120 generates a template, and passes control to a function block 1125. The function block 1125 performs template matching, and passes control to a function block 1130. The function block 1130 updates the target block with the prediction, and passes control to a function block 1135. The function block 1135 conducts transformation, quantization, and reconstruction (update residual) for the current target block with QP1, and passes control to a loop limit block 1140. The loop limit block 1140 ends the loop over all the sub-blocks, and passes control to a function block 1145. The function block 1145 stores the coefficients for step (2), and passes control to a loop limit block 1150. The loop limit block 1150 begins a loop over all sub-blocks, and passes control to a function block 1155. The function block 1155 generates a template based on the decoded picture or the reconstructed block from step (3), and passes control to a function block 1160. The function block 1160 performs template matching, and passes control to a function block 1165. The function block 1165 updates the target block with the prediction, and passes control to a loop limit block 1170. The loop limit block 1170 ends the loop over all the sub-blocks, and passes control to a function block 1175. The function block 1175 conducts transformation, quantization, and reconstruction (update residual) for the current block with QP2, and passes control to a function block 1180. The function block 1180 stores the coefficients for step (5), and passes control to a function block 1185. The function block 1185 encodes all syntax, the coefficients of steps (2) and (5), and so forth, and passes control to an end block 1199.

Figure 12:
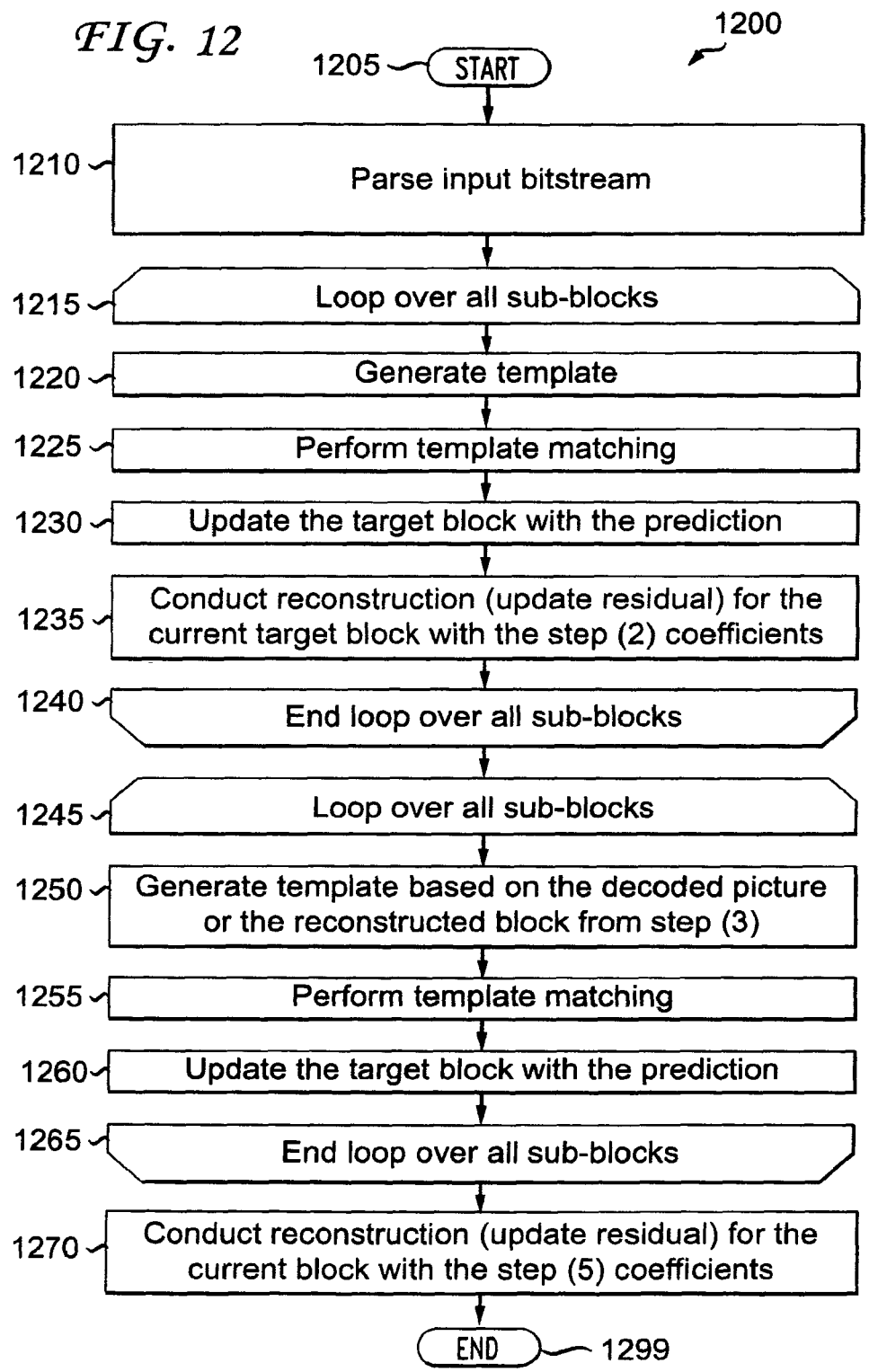
FIG. 12 is a flow diagram showing yet another exemplary method for adaptive residual updating of template matching prediction in a video decoder, in accordance with an embodiment of the present principles.

Turning to FIG. 12, yet another exemplary method for adaptive residual updating of template matching prediction in a video decoder is indicated generally by the reference numeral 1200. The method 1200 includes a start block 1205 that passes control to a function block 1210. The function block 1210 parses an input bitstream, and passes control to a loop limit block 1215. The loop limit block 1215 begins a loop over all sub-blocks, and passes control to a function block 1220. The function block 1220 generates a template, and passes control to a function block 1225. The function block 1225 performs template matching, and passes control to the function block 1230. The function block 1230 updates the target block with the prediction, and passes control to a function block 1235. The function block 1235 conducts reconstruction (update residual) to the current target block with the step (2) coefficients, and passes control to a loop limit block 1240. The loop limit block 1240 ends the loop over all the sub-blocks, and passes control to a function block 1245. The function block 1245 begins a loop over all sub-blocks, and passes control to a function block 1250. The function block 1250 generates a template based on the decoded picture or the reconstructed block from step (3), and passes control to a function block 1255. The function block 1255 performs template matching, and passes control to a function block 1260. The function block 1260 updates the target block with the prediction, and passes control to a loop limit block 1265. The loop limit block 1265 ends the loop over all the sub-blocks, and passes control to a function block 1270. The function block 1270 conducts reconstruction (update residual) to the current block with the step (5) coefficients, and passes control to an end bloc 1299.

Syntax

TABLE 2 shows exemplary slice header syntax for Embodiments 4, according to an embodiment of the present principles.

TABLE 2

| slice_header( ) { | Descriptor |
|---|---|
| ... | |
| use_tmp_res_upd_flag | u(1) |
| ... | |
| } | |
| marco_block_header( ) { | |
| ... | |
| if ( use_tmp_res_upd_flag == 1){ | |
| use_multi_layer_tmp_res_upd_flag | u(1) |
| } | |
| ... | |
| } | |

The semantics of some of the syntax elements of TABLE 2 are as follows:

use_tmp_res_upd_flag equal to 1 specifies the use of the multiple residual update scheme in template matching, use_tmp_res_upd equal to 0 specifies the use of only one residual update scheme.

use_multi_layer_tmp_res_upd_flag equal to 1 specifies the use of the multi-layer residual updating method; use_multi_layer_tmp_res_upd_flag equal to 0 specifies not to use the multi-layer residual updating method.

Embodiment 5: Multiple Combined Residual Updating Method

In this embodiment, a novel multiple combined residual updating method is proposed. Specifically, the basic block will be coded twice, presuming only the two residual updating methods presented here exist. Thus, it is to be appreciated that in other embodiments, involving more than two residual updating methods, the basic block may be coded more than twice.

Nonetheless, in the aforementioned example involving coding the basic block twice, first the block is coded by Method 2. Then we can get a reconstructed version of the basic block. Then the block is coded by Method 1. Finally, we combine the reconstructed block to form the final reconstructed block. The residuals in the two methods will be transmitted in a resultant bitstream. At the decoder, similar steps are performed.

Figure 13:
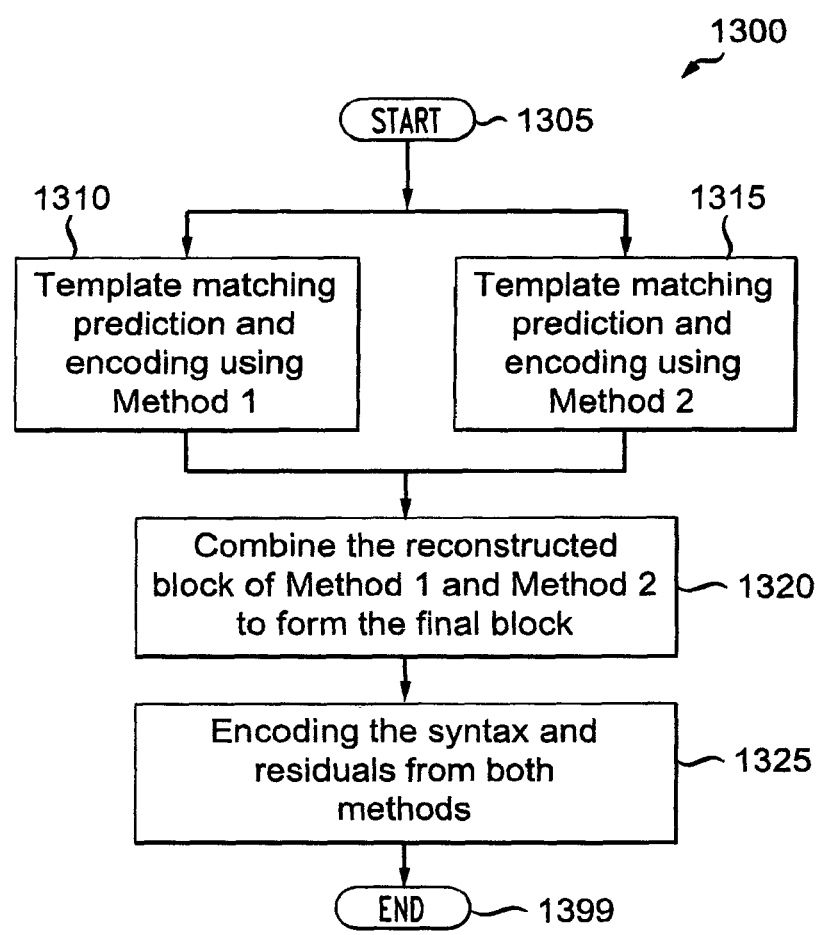
FIG. 13 is a flow diagram showing still another exemplary method for adaptive residual updating of template matching prediction in a video encoder, in accordance with an embodiment of the present principles.

Turning to FIG. 13, still another exemplary method for adaptive residual updating of template matching prediction in a video encoder is indicated generally by the reference numeral 1300. The method 1300 includes a start block 1305 that passes control to a function block 1310 and a function block 1315. The function blocks 1310 and 1315 conduct template matching and encoding to obtain two reconstructed versions of current block by using two independent residual updating schemes, namely, Method 1 and Method 2, respectively. Then the function blocks 1310 and 1315 pass control to function block 1320. The function block 1320 combines the two reconstructed versions obtained from the function blocks 1310 and 1315 to form the final reconstructed block of the current block, and passes the control to a function block 1325. The function block 1325 encodes all the syntax and residuals from both methods, and passes the control to an end block 1330.

Figure 14:
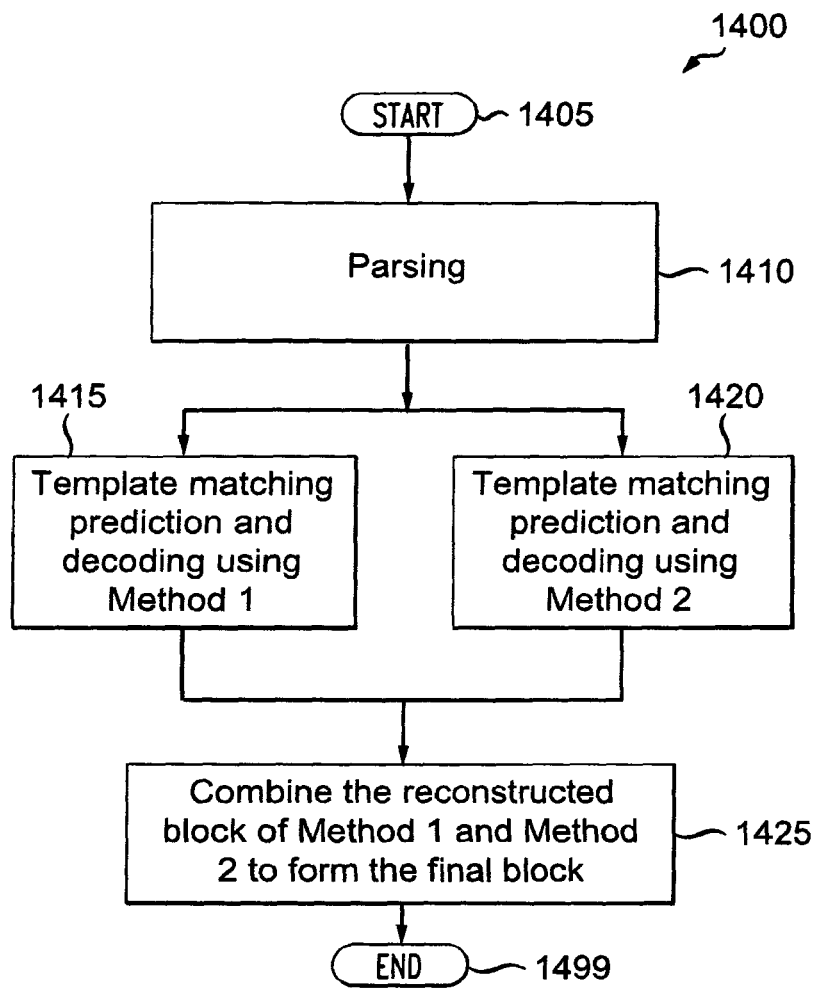
FIG. 14 is a flow diagram showing still another exemplary method for adaptive residual updating of template matching prediction in a video decoder, in accordance with an embodiment of the present principles.

Turning to FIG. 14, still another exemplary method for adaptive residual updating of template matching prediction in a video decoder is indicated generally by the reference numeral 1400. The method 1400 includes a start block 1405 that passes control to a function block 1410. The function block 1410 parses the bitstream, and passes the control to a function block 1415 and a function block 1420. The function blocks 1415 and 1420 conduct template matching prediction and decoding to obtain two reconstructed versions of current block by using two independent methods, namely Method 1 and Method 2, respectively. The function blocks 1415 and 1420 pass control to a function block 1425. The function block 1425 combines the reconstructed blocks obtained from the function blocks 1415 and 1420 to form the final reconstructed block of the current block, and passes the control to an end block 1430.

Syntax

TABLE 3 shows exemplary slice header syntax for Embodiments 5, according to an embodiment of the present principles.

TABLE 3

| slice_header( ) { | Descriptor |
| --- | --- |
| ... | |
| use_tmp_res_upd_flag | u(1) |
| ... | |
| } | |
| macro_block_header( ) { | |
| ... | |
| if ( use_tmp_res_upd_flag == 1){ | |
| use_comb_multi_tmp_res_upd_flag | u(1) |
| } | |
| ... | |
| } | |

The semantics of some of the syntax elements of TABLE 2 are as follows:

use_tmp_res_upd_flag equal to 1 specifies the use of the multiple residual update scheme in template matching, use_tmp_res_upd_flag equal to 0 specifies the use of only one residual update scheme.

use_comb_multi_tmp_res_upd_flag equal to 1 specifies the use of the multiple combined residual updating method; use_comb_multi_tmp_res_upd_flag equal to 0 specifies not to use the multiple combined residual updating method.

A description will now be given of some of the many attendant advantages/features of the present invention, some of which have been mentioned above. For example, one advantage/feature is an apparatus having a video encoder for encoding picture data for at least a block in a picture using template matching prediction, wherein the template matching prediction involves selecting from among a plurality of residual updating schemes for use in encoding the block.

Another advantage/feature is the apparatus having the video encoder as described above, wherein at least one of the plurality of residual updating schemes is selected based on a rate-distortion cost.

Yet another advantage/feature is the apparatus having the video encoder as described above, wherein each of the plurality of residual updating schemes involves partitioning the block into a plurality of sub-blocks, one of the plurality of residual updating schemes involves applying a transform to a residual of a particular sub-block from among the plurality of sub-blocks subsequent to searching for a prediction for the particular sub-block block and prior to completion of processing of the block with respect to the template matching prediction, and another one of the plurality of updating schemes involves applying the transform to the residual of the particular sub-block from among the plurality of sub-blocks subsequent to searching for the prediction for the particular sub-block block and subsequent to the completion of processing of the block with respect to the template matching prediction.

Still another advantage/feature is the apparatus having the video encoder as described above, wherein the plurality of residual updating schemes are explicitly indicated in a resultant bitstream.

Moreover, another advantage/feature is the apparatus having the video encoder as described above, wherein at least one of the plurality of residual updating schemes is selected based on at least one of decoded pictures corresponding to a same video sequence as the picture, quantization parameter values of at least one of the block, at least one sub-block within the block, and at least one neighboring block with respect to the block or the at least one sub-block, picture content statistics, partition information, and coding information of the at least one neighboring block.

Further, another advantage/feature is the apparatus having the video encoder as described above, wherein two or more of the plurality of residual updating schemes are combinable to predict the block.

Also, another advantage/feature is the apparatus having the video encoder wherein two or more of the plurality of residual updating schemes are combinable to predict the block as described above, wherein each of the plurality of residual updating schemes are independent with respect to each other, and a final prediction of the block is a combination of outputs of at least two of the plurality of residual updating schemes.

Additionally, another advantage/feature is the apparatus having the video encoder wherein two or more of the plurality of residual updating schemes are combinable to predict the block as described above, wherein the plurality of residual updating schemes are dependent on each other, and one output of a particular one of the plurality of residual updating schemes is dependent on at least one other output of at least one other particular one of the plurality of residual updating schemes.

Moreover, another advantage/feature is an apparatus having a video encoder for encoding a block in a picture using template matching prediction, wherein the template matching prediction involves partitioning the block into a plurality of sub-blocks, and applying a transform to a residual of a particular sub-block from among the plurality of sub-blocks subsequent to searching for a prediction for the particular sub-block block and prior to completion of processing of the block with respect to the template matching prediction.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus for video encoding, comprising:
a video encoder for encoding picture data for at least a block in a picture using template matching prediction, wherein later predicted blocks use reconstructed pixels as a template instead of using prediction data, and wherein the template matching prediction involves selecting from among a plurality of residual updating schemes for use in encoding the block,
wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and
another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block,
and wherein the block uses implicit switching of residual updating schemes based on previously encoded pictures and/or information comprising at least one of partition information neighboring blocks coding information comprising at least one of quantization parameter value, transform size, coefficients and mode, local picture content statistics comprising mean and/or variance, and, otherwise the block uses explicit switching of residual updating schemes.

2. In a video encoder, a method comprising:
encoding picture data for at least a block in a picture using template matching prediction, wherein later predicted blocks use reconstructed pixels as a template instead of using prediction data, and wherein the template matching prediction involves selecting from among a plurality of residual updating schemes for use in encoding the block,
wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and
another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block,
and wherein the block uses implicit switching of residual updating schemes based on previously encoded pictures and/or information comprising at least one of partition information, neighboring blocks coding information comprising at least one of quantization parameter value, transform size, coefficients and mode, local picture content statistics comprising mean and/or variance, and, otherwise the block uses explicit switching of residual updating schemes.

3. The method of claim 2, wherein at least one of the plurality of residual updating schemes is selected based on a rate-distortion cost.

4. The method of claim 2, wherein the plurality of residual updating schemes are explicitly indicated in a resultant bitstream.

5. An apparatus for video decoding, comprising:
a video decoder for decoding picture data for at least a block in a picture using template matching prediction, wherein later predicted blocks use reconstructed pixels as a template instead of using prediction data, and wherein the template matching prediction involves selecting from among a plurality of residual updating schemes for use in decoding the block,
wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block, and wherein the block uses implicit switching of residual updating schemes based on decoded picture information and/or information comprising at least one of partition information, neighboring blocks coding information comprising at least one of quantization parameter value, transform size, coefficients and mode, local picture content statistics comprising mean and/or variance, and, otherwise the block uses explicit switching of residual updating schemes.

6. In a video decoder, a method comprising:

decoding picture data for at least a block in a picture using template matching prediction, wherein later predicted blocks use reconstructed pixels as a template instead of using prediction data, and wherein the template matching prediction involves selecting from among a plurality of residual updating schemes for use in decoding the block, wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block, and wherein the block uses implicit switching of residual updating schemes based on decoded picture information and/or information comprising, partition information, neighboring blocks coding information comprising transform size and/or coefficients and/or mode, local picture content statistics comprising mean and/or variance, and, otherwise the block uses explicit switching of residual updating schemes.

7. A non-transitory computer readable storage medium having video signal data encoded thereupon, the medium comprising:

picture data encoded for at least a block in a picture using template matching prediction, wherein later predicted blocks use reconstructed pixels as a template instead of using prediction data, and wherein the template matching prediction involves selecting from among a plurality of residual updating schemes for use in encoding the block, wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block, and wherein the block uses implicit switching of residual updating schemes based on previously encoded pictures and/or information comprising, partition information, neighboring blocks coding information comprising transform size and/or coefficients and/or mode, local picture content statistics comprising mean and/or variance, and, otherwise the block uses explicit switching of residual updating schemes.

8. An apparatus for video encoding, comprising:

a video encoder for encoding a block in a picture using template matching prediction, wherein later predicted blocks use reconstructed pixels as a template instead of using prediction data, and wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block, and wherein the block uses implicit switching of residual updating schemes based on previously encoded pictures and/or information comprising, partition information, neighboring blocks coding information comprising transform size and/or coefficients and/or mode, local picture content statistics comprising mean and/or variance, and, otherwise the block uses explicit switching of residual updating schemes, wherein two or more of the plurality of residual updating schemes are combinable to predict the block and, wherein each of the plurality of residual updating schemes are independent with respect to each other, the block is coded by each residual updating scheme and each residual is included in a bitstream, and a final prediction of the block is a combination of outputs of at least two of the plurality of residual updating schemes.

9. In a video encoder, a method comprising:

encoding a block in a picture using template matching prediction, wherein later predicted blocks use reconstructed pixels as a template instead of using prediction data, and wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform quantization and reconstruction to any residual of said block, and another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block, and wherein the block uses implicit switching of residual updating schemes based on previously encoded pictures and/or information comprising, partition information, neighboring blocks coding information comprising transform size and/or coefficients and/or mode, local picture content statistics comprising mean and/or variance, and, otherwise the block uses explicit switching of residual updating schemes, wherein two or more of the plurality of residual updating schemes are combinable to predict the block and, wherein each of the plurality of residual updating schemes are independent with respect to each other, the block is coded by each residual updating scheme and each residual is included in a bitstream, and a final prediction of the block is a combination of outputs of at least two of the plurality of residual updating schemes.

10. An apparatus for video decoding, comprising:
a video decoder for decoding a block in a picture using template matching prediction, wherein later predicted blocks use reconstructed pixels as a template instead of using prediction data, and
wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block,
and wherein the block uses implicit switching of residual updating schemes based on blocks coding information comprising transform size and/or coefficients and/or mode, local picture content statistics comprising mean and/or variance, and, otherwise the block uses explicit switching of residual updating schemes, wherein two or more of the plurality of residual updating schemes are combinable to predict the block and, wherein each of the plurality of residual updating schemes are independent with respect to each other, the block is coded by each residual updating scheme and each residual is included in a bitstream, and a final prediction of the block is a combination of outputs of at least two of the plurality of residual updating schemes.

11. In a video decoder, a method comprising:
decoding a block in a picture using template matching prediction, wherein later predicted blocks use reconstructed pixels as a template instead of using prediction data, and
wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block,
and wherein the block uses implicit switching of residual updating schemes based on decoded picture information and/or information comprising, partition information, neighboring blocks coding information comprising transform size and/or coefficients and/or mode, local picture content statistics comprising mean and/or variance, and, otherwise the block uses explicit switching of residual updating schemes, wherein two or more of the plurality of residual updating schemes are combinable to predict the block and, wherein each of the plurality of residual updating schemes are independent with respect to each other, the block is coded by each residual updating scheme and each residual is included in a bitstream, and a final prediction of the block is a combination of outputs of at least two of the plurality of residual updating schemes.

12. A non-transitory computer readable storage medium having video signal data encoded thereupon, the medium comprising:
a block in a picture encoded using template matching prediction, wherein later predicted blocks use reconstructed pixels as a template instead of using prediction data, and
wherein each of the plurality of residual updating schemes involves partitioning the block into a plurality of sub-blocks, one of the plurality of residual updating schemes involves predicting pixels of a particular sub-block from predicted pixels representative of pixels of at least one other sub-block of said block to obtain a residual for said sub-block before applying any transform, quantization and reconstruction to any residual of said block, and another one of the plurality of residual updating schemes involves predicting pixels of the particular sub-block from reconstructed pixels representative of pixels of at least one other sub-block of said block to obtain a residual for said sub-block, said reconstructed pixels being obtained by a process comprising a transform, a quantization and a reconstruction applied to a residual of said at least one other sub-block,
and wherein the block uses implicit switching of residual updating schemes based on decoded picture information and/or information comprising, partition information, neighboring blocks coding information comprising transform size and/or coefficients and/or mode, local picture content statistics comprising mean and/or variance, and, otherwise the block uses explicit switching of residual updating schemes, wherein two or more of the plurality of residual updating schemes are combinable to predict the block and, wherein each of the plurality of residual updating schemes are independent with respect to each other, the block is coded by each residual updating scheme and each residual is included in a bitstream, and a final prediction of the block is a combination of outputs of at least two of the plurality of residual updating schemes.

13. An apparatus according to claim 1, wherein the block is coded by a first residual updating scheme for larger quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

14. A method according to claim 2, wherein the block is coded by a first residual updating scheme for lamer quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

15. An apparatus according to claim 5, wherein the block is coded b a first residual updating scheme for larger quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

16. A method according to claim 6, wherein the block is coded by a first residual updating scheme for larger quantization parameters, and, wherein the block is coded by a second residual updating scheme for smaller quantization parameters, wherein in the first residual updating scheme, larger transformation sizes are exploited, and in the second residual updating scheme, smaller transform sizes are exploited.

17. A non-transitory computer readable storage media according to claim 7, wherein, the block is coded by a first residual updating scheme for larger quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

18. An apparatus according to claim 8, wherein the block is coded by a first residual updating scheme for larger quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

19. A method according to claim 1, wherein the block is coded by a first residual updating scheme for larger quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

20. An apparatus according to claim 10, wherein the block is coded by a first residual updating scheme for larger quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

21. A method according to claim 11, wherein the block is coded by a first residual updating scheme for larger quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

22. A non-transitory computer readable storage media according to claim 12, wherein, the block is coded by a first residual updating scheme for larger quantization parameters, and, wherein the block is coded by a second residual updating scheme for smaller quantization parameters; wherein in the first residual updating scheme, larger transformation sizes are exploited, and in the second residual updating scheme, smaller transform sizes are exploited.

\* \* \* \* \*

UNITED STATES PATENT AND TRADEMARK OFFICE
CERTIFICATE OF CORRECTION

PATENT NO. : 10,743,027 B2
APPLICATION NO. : 13/514814
DATED : August 11, 2020
INVENTOR(S) : Yunfei Zheng et al.

It is certified that error appears in the above-identified patent and that said Letters Patent is hereby corrected as shown below:

In the Claims

At Column 20, Line 4, in Claim 1, delete "information" and insert --information,--.

At Column 23, Line 2-3, in Claim 9, delete "transform" and insert --transform,--.

At Column 23, Line 55, in Claim 10, after "on", insert --decoded picture information and/or information comprising, partition information, neighboring--.

At Column 25, Line 21, in Claim 14, delete "lamer" and insert --larger--.

At Column 25, Line 29, in Claim 15, delete "b" and insert --by--.

At Column 25, Line 40, in Claim 16, delete "parameters," and insert --parameters;--.

Signed and Sealed this
Seventeenth Day of October, 2023

Katherine Kelly Vidal
*Director of the United States Patent and Trademark Office*